United States Patent
Philpott et al.

(10) Patent No.: US 9,335,760 B2
(45) Date of Patent: *May 10, 2016

(54) TEMPLATE FRAMEWORK FOR AUTOMATED PROCESS ROUTING

(71) Applicant: aPriori Technologies, Inc., Concord, MA (US)

(72) Inventors: Michael L. Philpott, Seymour, IL (US); Jeremy D. Rishel, Boston, MA (US); Elisha Gallaudet, Arlington, MA (US); Emmanuel Gerlovin, Wayland, MA (US)

(73) Assignee: aPriori Technologies, Inc., Concord, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/541,560

(22) Filed: Nov. 14, 2014

(65) Prior Publication Data

US 2015/0198946 A1    Jul. 16, 2015

Related U.S. Application Data

(63) Continuation of application No. 12/893,247, filed on Sep. 29, 2010, now Pat. No. 8,914,141.

(60) Provisional application No. 61/248,110, filed on Oct. 2, 2009.

(51) Int. Cl.
    *G06F 19/00*    (2011.01)
    *G05B 19/418*    (2006.01)
    *G06Q 10/04*    (2012.01)

(52) U.S. Cl.
    CPC .......... *G05B 19/41865* (2013.01); *G06Q 10/04* (2013.01); *G05B 2219/32304* (2013.01)

(58) Field of Classification Search
    USPC .......................................................... 700/99
    See application file for complete search history.

(56) References Cited

U.S. PATENT DOCUMENTS 5,119,318 A    6/1992   Paradies et al.
5,249,120 A    9/1993   Foley (Continued)

FOREIGN PATENT DOCUMENTS

DE    201 19282 U 1    2/2002
EP    0508308    3/1998

OTHER PUBLICATIONS

Advisory Action dated Oct. 26, 2009 from U.S. Appl. No. 10/993,405, 3 pages.

(Continued)

*Primary Examiner* — Carlos Ortiz Rodriguez
(74) *Attorney, Agent, or Firm* — Hamilton, Brook, Smith & Reynolds, P.C.

(57) ABSTRACT

A method and corresponding system is provided for determining an optimum manufacturing process routing. The method comprises electronically constructing a plurality of manufacturing process routings for a component to be manufactured. The electronically constructing for each manufacturing process routing of the plurality of manufacturing process routings comprises defining a recursive process routing tree for each manufacturing process routing, the recursive process routing tree comprising a plurality of nodes, each node of the plurality of nodes corresponding to a manufacturing process and comprising a branch node when the manufacturing process for a given node may be decomposed into a plurality of sub-processes for the given node. The method further comprises electronically determining an optimum process routing by evaluating each recursive process routing tree with reference to a cost for manufacturing the component to be optimized and determining the optimum process routing that minimizes the cost for manufacturing the component.

12 Claims, 21 Drawing Sheets

(56) References Cited

U.S. PATENT DOCUMENTS

| | | | |
|---|---|---|---|
| 5,355,445 A | 10/1994 | Shibao et al. |
| 5,552,995 A | 9/1996 | Sebastian |
| 5,655,087 A | 8/1997 | Hino et al. |
| 5,793,632 A | 8/1998 | Fad et al. |
| 5,799,286 A | 8/1998 | Morgan et al. |
| 5,880,959 A | 3/1999 | Shah et al. |
| 5,970,476 A | 10/1999 | Fahey |
| 6,223,092 B1 | 4/2001 | Miyakawa et al. |
| 6,341,243 B1 | 1/2002 | Bourne et al. |
| 6,507,825 B2 | 1/2003 | Suh |
| 6,633,854 B1 | 10/2003 | Moore |
| 6,775,647 B1 | 8/2004 | Evans et al. |
| 7,065,420 B1 | 6/2006 | Philpott et al. |
| 7,292,965 B1 | 11/2007 | Mehta et al. |
| 7,346,588 B2 | 3/2008 | Shimizu et al. |
| 7,398,254 B2 | 7/2008 | Ueda et al. |
| 7,657,455 B2 | 2/2010 | Sachdev et al. |
| 8,078,489 B1 | 12/2011 | Marsten |
| 8,412,558 B2 | 4/2013 | Srinivasan et al. |
| 8,914,141 B2 | 12/2014 | Philpott et al. |
| 2001/0016803 A1 | 8/2001 | Sartiono et al. |
| 2001/0023418 A1 | 9/2001 | Suzuki et al. |
| 2001/0037190 A1 | 11/2001 | Jung |
| 2002/0026392 A1 | 2/2002 | Shimizu et al. |
| 2002/0178027 A1 | 11/2002 | Kawano et al. |
| 2003/0101098 A1 | 5/2003 | Schaarschmidt |
| 2005/0021471 A1 | 1/2005 | Zlotnick |
| 2005/0065863 A1 | 3/2005 | Plumer et al. |
| 2005/0071135 A1 | 3/2005 | Vredenburgh et al. |
| 2005/0120010 A1 | 6/2005 | Philpott et al. |
| 2014/0067479 A1 | 3/2014 | Stacklin et al. |

OTHER PUBLICATIONS

Baker, J.R., "What's on the Horizon for Engineering Software? The Future of Mechanical CAD," *Design News*, Jan. 17, 2000, 94-98.

Boothroyd, G., et al., "Approximate Cost Estimate for Typical Turned Parts," *Journal of Manufacturing Systems*, 8(3) 1989, 185-193.

Cuesta, E., et al., "Times and Costs Analysis for Sheet-Metal Cutting Processes in an Integrated CAD/CAM System," *Int. J. Prod. Res.*, 1998, 1733-1747.

Dereli, T., et al., "Optimizing Cutting Parameters in Process Planning of Prismatic Parts by Using Genetic Algorithms," *International Journal of Production Research*, 39(15) 2001, 3303-3328.

Falcidieno, B., et al., "Automatic Recognition and Representation of Shape-Based Features in Geometric' Modeling System," *Computer Vision, Graphics and. Image Processing*, vol. 48, 1989, 93-123.

Final Office Action dated Aug. 1, 2008 from U.S. Appl. No. 10/993,405, 20 pages.

Final Office Action dated Aug. 11, 2009 from U.S. Appl. No. 10/993,405, 22 pages.

Final Office Action dated Aug. 6, 2010 from U.S. Appl. No. 10/993,405, 22 pages.

Final Office Action from U.S. Appl. No. 10/993,405, dated May 20, 2014, "System and Method for Determining Costs Within an Enterprise".

Goldberg, D.E., "Genetic Algorithms in Search Optimization and Machine Learning," *The University of Alabama*, Addison Wesley Publishing Company, Inc., 1989, 87-145.

Hiller, E.A., "Parametric Cost Modeling: An Application to Sheet Metal," *MS Thesis*, Univ. of Illinois at Urbana-Champaign, 1997, 1-172.

Khan, Z., et al., "Machining Condition Optimization by Genetic Algorithms and Simulated Annealing," *Computers Ops Res.*, 24(7) 1997, 647-657.

Kim, Y.S., et al., "The Development of an Automated Cost Estimating System Using 3D CAD and Relational Database," *International Symposium on Automation and Robotics in Construction*, 2000, 827-833.

Kraus, B., et al., "Midmarket Survey Shows Manufacturers Have Been Slow to Embrace PLM," *AMR Research Report*, Oct. 2003, 1-14.

Leibl, P., et al., "Cost Calculation with a Feature-Based CAD System Using Modules for Calculation, Comparison and Forecast," *Journal of Engineering Design*, 10(1), 1999, 93-102.

Marini, M.V., "Parametric Modeling for Early Cost Estimation of Sheet Metal Parts," *MS Thesis*, Univ. of Illinois at Urbana-Champaign, 1999, 1-104.

Michaels, J.V., et al., "Design to Cost," *New Dimensions in Engineering*, John Wiley and Sons, Inc., NY, 1989, 77-144.

Office Action dated Feb. 19, 2010 from U.S. Appl. No. 10/993,405, 21 pages.

Office Action dated Jan. 22, 2008 from U.S. Appl. No. 10/993,405, 27 pages.

Office Action dated Nov. 20, 2008 from U.S. Appl. No. 10/993,405, 21 pages.

Office Action for U.S. Appl. No. 10/993,405, Mail Date: Mar. 29, 2012.

Office Action from U.S. Appl. No. 10/993,405 dated Oct. 15, 2012.

Office Action from U.S. Appl. No. 10/993,405 dated Oct. 7, 2013.

Regli, W.C., "A Survey of Automated Feature Recognition Techniques," *Department of Computer Science and Systems Research Center*, University of Maryland, College Park, MD, 1992, 1-12.

Schrader, R.S., "Feature Based Costing of Sheet Metal and Axisymmetric Turned Parts," *M.S. Thesis*, Univ. of Illinois, at Urbana-Champaign, 2003, 1-171.

Schrader, R.S., et al., "A Genetic Algorithm for Cost Estimating Turned Parts in an Interactive DFM Environment," *Proceedings of DETC '03, ASME 2003 International Design*, Chicago, Illinois, Sep. 2-6, 2003, 187-193.

Soliman, F., et al., "Critical Success Factors for Integration of CAD/CAM Systems with ERP Systems," *International Journal of Operations & Production Management*, vol. 21(5/6), 2001, 609-629.

Subbarao, G., "Feature Based Costing of Welded Assemblies and Axisymmetrically Turned Parts," *M.S. Thesis*, Univ. of Illinois at Urbana-Champaign, 2002, 1-179.

Subbarao, G., et al., "Feature Based Costing (FBC) of Welded Assemblies: A Genetic Approach," *Proceedings of IMECE '02, ASME International Mechanical Engineering Congress & Exposition*, New Orleans, Louisiana, Nov. 17-22, 2002, 1-9.

Tinham, B., "CAD into ERP Will Go," *Manufacturing Computer Solutions*, May 2003, 22-24.

Winchell, W., 11989, "Realistic Cost Estimation for Manufacturing: (2nd Edition)," *Society of Manufacturing Engineers*, Dearborn, MI, 1989, 56-67.

Figure 1 Casting Template Example
Casting/Machining ::= Casting Machining
Casting ::= SandCasting | Die Casting
SandCasting ::= Melting 'Molding and Coring' Shakeout Cleaning Finishing
'Molding and Coring' ::= VerticalAuto | HorizontalAuto | ManualStandard | ManualFloor
VerticalAuto ::= [VerticalAutoCoremaking] 'Vertical Automatic'
HorizontalAuto ::= [HorizontalAutoCoremaking] 'Horizontal Automatic'
ManualStandard ::= [ManualStandardCoremaking] 'Manual Std Moldmaking' Pour Cool
ManualFloor ::= [ManualFloorCoremaking] 'Manual Floor Moldmaking' Pour Cool
VerticalAutoCoremaking ::= ['Stock Core'] ['Isocure Gas'] ['CO2 Cured'] [Shell] ['Hot Box']
HorizontalAutoCoremaking ::= ['Stock Core'] ['Isocure Gas'] ['CO2 Cured'] [Shell]['Oil Core'] ['Hot Box'] ['No Bake']
ManualStandardCoremaking ::= ['Stock Core'] ['Isocure Gas'] [Shell] ['Hot Box']
ManualFloorCoremaking ::= ['Stock Core'] ['Isocure Gas'] [Shell] ['Oil Core'] ['Hot Box'][No Bake']
Machining ::= ['3 Axis Mill']

FIG. 1

COMPONENT TEMPLATE
Bar&Tube/Machining ::= Bar&Tube [3AxisMill]
Bar&Tube ::= [Holemaking] [Bending] [Punching]
204 — HoleMaking ::= LaserCutting | Punching
205 — Bending ::= RotaryDraw | Compression | BendBrake

SIMPLEHOLE TEMPLATE
Bar&Tube/Machining ::= LaserOnly | PunchOnly | LaserBore | PunchBore
LaserOnly ::= LaserCutting
PunchOnly ::= Punching
LaserBore ::= LaserCutting Boring
PunchBore ::= Punching Boring

BEND TEMPLATE
Bar&Tube ::= RotaryDrawBending | CompressionBending | BendBrake

SIMPLIFIED BAR & TUBE TEMPLATES

FIG. 2 sheet metal ComponentTemplateSpec
// PROCESS TEMPLATE
// GCD: Component (aka Part)
// Created: 5/4/2007
// File: ComponentTemplateSpec.txt
// Applies to: Casting and Bar & Tube
// Note 1: See GCO Templates for specific GCD-level templates // SHEET METAL PROCESSES
'Sheet Metal/Machining' ::= 'Sheet Metal' Machining 'Surface Treatment'
'Sheet Metal' ::= '[CTL]/Laser/[Bend]' | '[CTL]/Plasma/[Deslag]/[Bend]' |
'[CTL]/Oxyfuel/[Deslag]/[Bend]' | '[CTL]/Turret/[Deburr]/[Bend]' |
'[CTL]Shear/Press' | 'Stage Tooling'
'[CTL]/Laser/[Bend]' ::= 'Material Stock' : 'Sheet Metal' [CTL: 'Sheet Metal'] ['Laser Cut' : 'Sheet Metal'] ['Bend Brake' : 'Sheet Metal']
'[CTL]/Plasma/[Deslag]/[Bend]' ::= 'Material Stock' : 'Sheet Metal' [CTL: 'Sheet Metal'] ['Plasma Cut' : 'Sheet Metal'] [Deslag: 'Sheet Metal'] ['Bend Brake' : 'Sheet Metal']
'[CTL]/Oxyfuel/[Deslag]/[Bend]' ::= 'Material Stock' : 'Sheet Metal' [CTL: 'Sheet Metal'] ['Oxyfuel Cut' : 'Sheet Metal'] [Deslag: 'Sheet Metal'] ['Bend Brake' : 'Sheet Metal']
'[CTL]/Turret/[Deburr]/[Bend]' ::= 'Material Stock' : 'Sheet Metal' [CTL: 'Sheet Metal'] ['Turret Press' : 'Sheet Metal'] [Deburr: 'Sheet Metal'] ['Bend Brake' : 'Sheet Metal']
'[CTL]/Shear/Press' ::= 'Material Stock' : 'Sheet Metal' [CTL: 'Sheet Metal'] [Shear: 'Sheet Metal'] ['Std Press' : 'Sheet Metal']
'Stage Tooling' ::= ('Generic Press' : 'Sheet Metal')*
Machining ::= ['3 Axis Mill' : Machining']
'Surface Treatment' ::= <Painting: 'Surface Treatment'> <'Shot Blast' : 'Surface Treatment'>

FIG. 15 sheet metal simpleholeTemplateSpec
// OPERATION TEMPLATE
// GCD: Simplehole
// File: simpleholeTemplateSpec.txt
// Created: 5/4/2007
// Applies to: Sheet Metal // SHEET METAL OPERATIONS
'Sheet Metal/Machining' ::= 'Sheet Metal' Machining
'Sheet Metal' ::= 'Laser Cutting' : 'Laser Cut' : 'Sheet Metal' | 'Plasma CuttingDeslag Deslag' | 'OxyFuel Cutting Deslag' | 'Turret Press Deburr' | 'Std Press' : 'Std Press' : Sheet Metal' | 'Stage Tooling' | 'As Supplied' : 'Material Stock' : Sheet Metal'
'Plasma Cutting Deslag' ::= 'Plasma Cutting' : 'Plasma Cut' : 'Sheet Metal'
<Deslag : Deslag : 'Sheet Metal'>
'OxyFuel Cutting Deslag' ::= 'OxyFuel Cutting' : 'OxyFuel Cut' : 'Sheet Metal'
<Deslag : Deslag : 'Sheet Metal'>
'Turret Press Deburr' ::= 'Turret Press' : 'Turret Press' : 'Sheet Metal'
<Deburr : Deburr : 'Sheet Metal'>
'Stage Tooling' ::= Piercing : 'Generic Press' : 'Sheet Metal' <CounterSinking: 'Generic Press' : 'Sheet Metal'> <Extruding : 'Generic Press' : 'Sheet Metal'>
Machining ::= <Boring : Machining>

FIG. 16 sheet metal straightBendTemplateSpec

// OPERATION TEMPLATE
// GCD: StraightBend
// File: straightBendTemplateSpec.txt
// Created: 10/1/2008
// Applies to: Sheet Metal // SHEET METAL OPERATIONS
'Sheet Metal' ::= Bending: 'Bend Brake' : 'Sheet Metal' | 'Std Press' : 'Std Press' : 'Sheet Metal' | 'Stage Tooling'
'Stage Tooling' ::= <Scoring: 'Generic Press' : 'Sheet Metal' > Bending: 'Generic Press' : 'Sheet Metal' <Bending: 'Generic Press' : 'Sheet Metal' > (CamOverBending: 'Generic Press' : 'Sheet Metal')* <DownOverBending: 'Generic Press' : 'Sheet Metal' > <Setting: 'Generic Press' : 'Sheet Metal' >

FIG. 17 casting componentTemplateSpec

```
// PROCESS TEMPLATE
// GCD: Component (aka Part)
// File: componentTemplateSpec.txt
// Applies To: Casting and Bar & Tube
// Note 1: See GCD Templates for specific GCD-level templates // CASTING OPERATIONS
// At the highest level, you cast and perhaps machine the part
Casting/Machining ::= Casting Machining SurfaceTreatment
Casting ::= SandCasting | 'Die Casting' : Casting
SandCasting ::= Melting : Casting 'Molding and Coring' Shakeout : Casting
Cleaning : Casting Finishing : Casting 'InLine Inspection' : Casting
'Molding and Coring' ::= VerticalAuto | HorizontalAuto | ManualStandard |
ManualFloor'
#VerticalAuto ::= [VerticalAutoCoremaking] 'Vertical Automatic' : Casting
#HorizontalAuto ::= [HorizontalAutoCoremaking] 'Horizontal Automatic' : Casting
#ManualStandard ::= [ManualStandardCoremaking] 'Manual Std Moldmaking' : Casting
Pour : Casting Cool : Casting
#ManualFloor ::= [ManualFloorCoremaking] 'Manual Floor Moldmaking' : Casting
Pour : Casting Cool : Casting
VerticalAutoCoremaking ::= ['Stock Core' : Casting] ['Isocure Gas' : Casting] ['CO2
Cured' : Casting] [Shell : Casting] ['Hot Box' : Casting]
HorizontalAutoCoremaking ::= ['Stock Core' : Casting] ['Isocure Gas' : Casting] ['CO2
Cured' : Casting] [Shell : Casting] ['Oil Core' : Casting] ['Hot Box' : Casting] ['No
Bake' : Casting]
ManualStandardCoremaking ::= ['Stock Core' : Casting] ['Isocure Gas' : Casting]
[Shell : Casting] ['Hot Box' : Casting]
ManualFloorCoremaking ::= ['Stock Core' : Casting] ['Isocure Gas' : Casting]
[Shell : Casring] ['Oil Core' : Casting] ['Hot Box' : Casting] ['No Bake' : Casting
Machining ::= ['3 Axis Mill' : Machining]
SurfaceTreatment ::= <Painting: 'Surface Treatment'>
```

FIG. 18 casting simpleHoleTemplateSpec

// OPERATION TEMPLATE
// GCD: SimpleHole
// File: SimpleHoleTemplateSpec.txt
// Created: 5/4/2007
// Applies to: Casting, and Bar & Tube Fab, and Machining // CASTING OPERATIONS
Casting/Machining ::= CastingOnly | CastingFinishMachining
CastingFinishMachining ::= Casting boring : Machining
CastingOnly ::= SandCastingOnly | DieCastingOnly
SandCastingOnly ::= SandCasting // provides a place to put feasibility rule for SandCasting only
DieCastingOnly ::= DieCasting // provides a place to put feasibility rule for DieCasting only
Casting ::= SandCasting | DieCasting
SandCasting ::= GreenSandHoleCasting : Casting | Coring | SandCastAsComboVoid : Casting | SandCastAsMStepHole : Casting
Coring (Casting/Machining : VerticalAutoCoremaking) ::= StockCoreHoleCoring : Casting | IsocureGasHoleCoring : Casting | CO2CuredHoleCoring : Casting | ShellHoleCoring : Casting | HotBoxHoleCoring : Casting
Coring (Casting/Machining : HorizontalAutoCoremaking) ::= StockCoreHoleCoring : Casting | IsocureGasHoleCoring : Casting | CO2CuredHoleCoring : Casting | ShellHoleCoring : Casting | OilCoreHoleCoring : Casting | HotBoxHoleCoring : Casting | NoBakeHoleCoring : Casting
Coring (Casting/Machining : ManualStandardCoremaking) ::= StockCoreHoleCoring : Casting | IsocureGasHoleCoring : Casting | ShellHoleCoring : Casting | HotBoxHoleCoring : Casting
Coring (Casting/Machining : ManualFloorCoremaking) ::= StockCoreHoleCoring : Casting | IsocureGasHoleCoring : Casting | ShellHoleCoring : Casting | OilCoreHoleCoring : Casting | HotBoxHoleCoring : Casting | NoBakeHoleCoring : Casting
DieCasting ::=HoleNoCoring : Casting | HoleInsertCoring : Casting | HoleSideCoring : Casting | HoleUnscrewing : Casting | DieCastAsComboVoid : Casting | DieCastAsMStepHole : Casting

FIG. 19 casting voidTemplateSpec

```
// OPERATION TEMPLATE
// GCD: Void
// File: VoidTemplateSpec.txt
// Created: 6/4/2007
// Applies to: Casting // CASTING OPERATIONS
Casting ::= SandCasting | DieCasting
SandCasting ::= GreenSandVoidCasting : Casting | Coring
#Coring (Casting/Machining : VerticalAutoCoremarking)  ::= IsocureGasVoidCoring : Casting
| CO2CuredVoidCoring : Casting | ShellVoidCoring : Casting | HotBoxVoidCoring : Casting
| HotBoxVoidCoring : Casting | NoBakeVoidCoring : Casting
#Coring (Casting/Machining : ManualStandardCoremarking)  ::= IsocureGasVoidCoring :
Casting | ShellVoidCoring : Casting | HotBoxVoidCoring : Casting
#Coring (Casting/Machining : ManualFloorCoremarking)  ::= IsocureGasVoidCoring :
Casting | ShellVoidCoring : Casting | OilCoreVoidCoring : Casting | HotBoxVoidCoring :
Casting | NoBakeVoidCoring : Casting
DieCasting ::= VoidNoCoring : Casting | VoidInsertCoring : Casting |
VoidSideCoring : Casting
```

FIG. 20

TEMPLATE FRAMEWORK FOR AUTOMATED PROCESS ROUTING

RELATED APPLICATIONS

This application is a continuation of U.S. application Ser. No. 12/893,247, filed Sep. 29, 2010, which claims the benefit of U.S. Provisional Application No. 61/248,110, filed on Oct. 2, 2009.

The entire teachings of the above applications are incorporated herein by reference.

BACKGROUND OF THE INVENTION

In optimizing manufacturing cost in a CAD-integrated cost management system, a key challenge is devising a method for encoding the set of available Process Routings that comprise a real or virtual production facility. Each routing may be stored individually as a list of process steps. However, as the system evolves and the complexity of the manufacturing facility increases, such a list approach has a number of shortcomings.

SUMMARY OF THE INVENTION

In accordance with an embodiment of the invention, there is provided a method for determining an optimum manufacturing process routing. The method comprises electronically constructing a plurality of manufacturing process routings for a component to be manufactured. The electronically constructing for each manufacturing process routing of the plurality of manufacturing process routings comprises defining a recursive process routing tree for each manufacturing process routing. The recursive process routing tree comprises a plurality of nodes, each node of the plurality of nodes corresponding to a manufacturing process and comprising a branch node when the manufacturing process for a given node may be decomposed into a plurality of sub-processes for the given node. The electronically constructing is performed using at least one computer processor programmed to so electronically construct the plurality of manufacturing process routings. The method further comprises electronically determining an optimum process routing of the plurality of manufacturing process routings by evaluating each recursive process routing tree for the plurality of manufacturing process routings with reference to an electronic process routing variable to be optimized and determining the optimum process routing that minimizes the electronic process routing variable to be optimized. The electronically determining is performed using the at least one computer processor, which is further programmed to so electronically determine the optimum process routing.

In further, related embodiments, the electronic process routing variable to be optimized may be selected from the group consisting of at least one of: electronic data representing a cost for manufacturing the component; electronic data representing a production time for manufacturing the component; and electronic data representing a capacity used for manufacturing the component. At least one recursive process routing tree may comprise at least one node corresponding to an optional manufacturing process; and may comprise at least one node corresponding to a repeated manufacturing process. The electronically constructing the plurality of manufacturing process routings may comprise defining a recursive process routing tree for each alternative manufacturing process routing defined in a hierarchical routing template specification and evaluating the feasibility of each node of each recursive process routing tree for each alternative manufacturing process routing. The defining the recursive routing tree for each alternative manufacturing process routing and the evaluating the feasibility of each node are performed by the at least one computer processor, the at least one computer processor being further programmed to so electronically define the recursive routing tree and to so electronically evaluate the feasibility.

In a further, related embodiment, the evaluating the feasibility may comprise evaluating each recursive process routing tree in a depth-first fashion and discarding a portion of each recursive process routing tree rooted at a given node when the given node is found to be infeasible. The evaluating the feasibility is performed by the at least one computer processor, the at least one computer processor being further programmed to so electronically evaluate the feasibility.

In another related embodiment, the electronically determining an optimum process routing of the plurality of manufacturing process routings by evaluating each recursive process routing tree for the plurality of manufacturing process routings may comprise: (i) performing a post-order traversal of each recursive process routing tree to determine a cost for each recursive process routing tree, the performing the post-order traversal comprising determining a cost of each child node of each given node to derive the cost of the given node from the costs of its one or more child nodes; and (ii) selecting a lowest cost recursive process routing tree for the plurality of manufacturing process routings. The electronically determining an optimum process routing is performed by the at least one computer processor, the at least one computer processor being further programmed to so electronically determine an optimum process routing.

The method may further comprise evaluating a cost for manufacturing at least one geometric cost driver with reference to a geometric model of the component to be manufactured. The recursive process routing tree for each manufacturing process routing may comprise a plurality of viable processes for manufacturing the component and a plurality of viable manufacturing operations to be performed as part of the plurality of viable processes.

In a further related embodiment, the method may further comprise electronically determining an optimum number of times to perform a repeated manufacturing process, the electronically determining the electronically determining the optimum number of times being performed using the at least one computer processor, the at least one computer processor being further programmed to so electronically determine the optimum number of times. The electronically determining the optimum number of times to perform the repeated manufacturing process may be performed using a plurality of electronic rules governing precedence and compatibility of processes within the repeated manufacturing process.

In another embodiment according to the invention, there is provided a system for determining an optimum manufacturing process routing. The system comprises at least one computer processor, the at least one computer processor including a routing generation system and a routing evaluation system. The routing generation system is programmed to electronically construct a plurality of manufacturing process routings for a component to be manufactured, the electronically constructing for each manufacturing process routing of the plurality of manufacturing process routings comprising defining a recursive process routing tree for each manufacturing process routing. The recursive process routing tree comprises a plurality of nodes, each node of the plurality of nodes corresponding to a manufacturing process and comprising a branch node when the manufacturing process for a given node may be decomposed into a plurality of sub-processes for the given node. The routing evaluation system is programmed to electronically determining an optimum process routing of the plurality of manufacturing process routings by evaluating each recursive process routing tree for the plurality of manufacturing process routings with reference to an electronic process routing variable to be optimized and determining the optimum process routing that minimizes the electronic process routing variable to be optimized.

In further, related embodiments, the electronic process routing variable to be optimized may be selected from the group consisting of at least one of: electronic data representing a cost for manufacturing the component; electronic data representing a production time for manufacturing the component; and electronic data representing a capacity used for manufacturing the component. At least one recursive process routing tree may comprise at least one node corresponding to an optional manufacturing process or at least one node corresponding to a repeated manufacturing process. The routing generation system may comprise a system programmed to electronically construct the plurality of manufacturing process routings by a process comprising defining a recursive process routing tree for each alternative manufacturing process routing defined in a hierarchical routing template specification and evaluating the feasibility of each node of each recursive process routing tree for each alternative manufacturing process routing. The evaluating the feasibility may comprise evaluating each recursive process routing tree in a depth-first fashion and discarding a portion of each recursive process routing tree rooted at a given node when the given node is found to be infeasible.

In another related embodiment, the routing evaluation system may comprise a system programmed to electronically determine an optimum process routing of the plurality of manufacturing process routings by evaluating each recursive process routing tree for the plurality of manufacturing process routings by a process comprising: (i) performing a post-order traversal of each recursive process routing tree to determine a cost for each recursive process routing tree, the performing the post-order traversal comprising determining a cost of each child node of each given node to derive the cost of the given node from the costs of its one or more child nodes; and (ii) selecting a lowest cost recursive process routing tree for the plurality of manufacturing process routings. The routing evaluation system may comprise a system programmed to evaluate a cost for manufacturing at least one geometric cost driver with reference to a geometric model of the component to be manufactured. The recursive process routing tree for each manufacturing process routing may comprise a plurality of viable processes for manufacturing the component and a plurality of viable manufacturing operations to be performed as part of the plurality of viable processes.

In further related embodiments, the system may further comprise a repeat processing system programmed to electronically determine an optimum number of times to perform a repeated manufacturing process. The repeat processing system may be further programmed to electronically determine the optimum number of times to perform the repeated manufacturing process using at least a plurality of electronic rules governing precedence and compatibility of processes within the repeated manufacturing process.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is an example of a routing template specification in accordance with an embodiment of the invention;

FIG. 2 shows a set of templates for a simplified process group, in accordance with an embodiment of the invention;

FIGS. 15 through 20 are examples of templates in accordance with an embodiment of the invention.

DETAILED DESCRIPTION OF THE INVENTION

Figure 3:
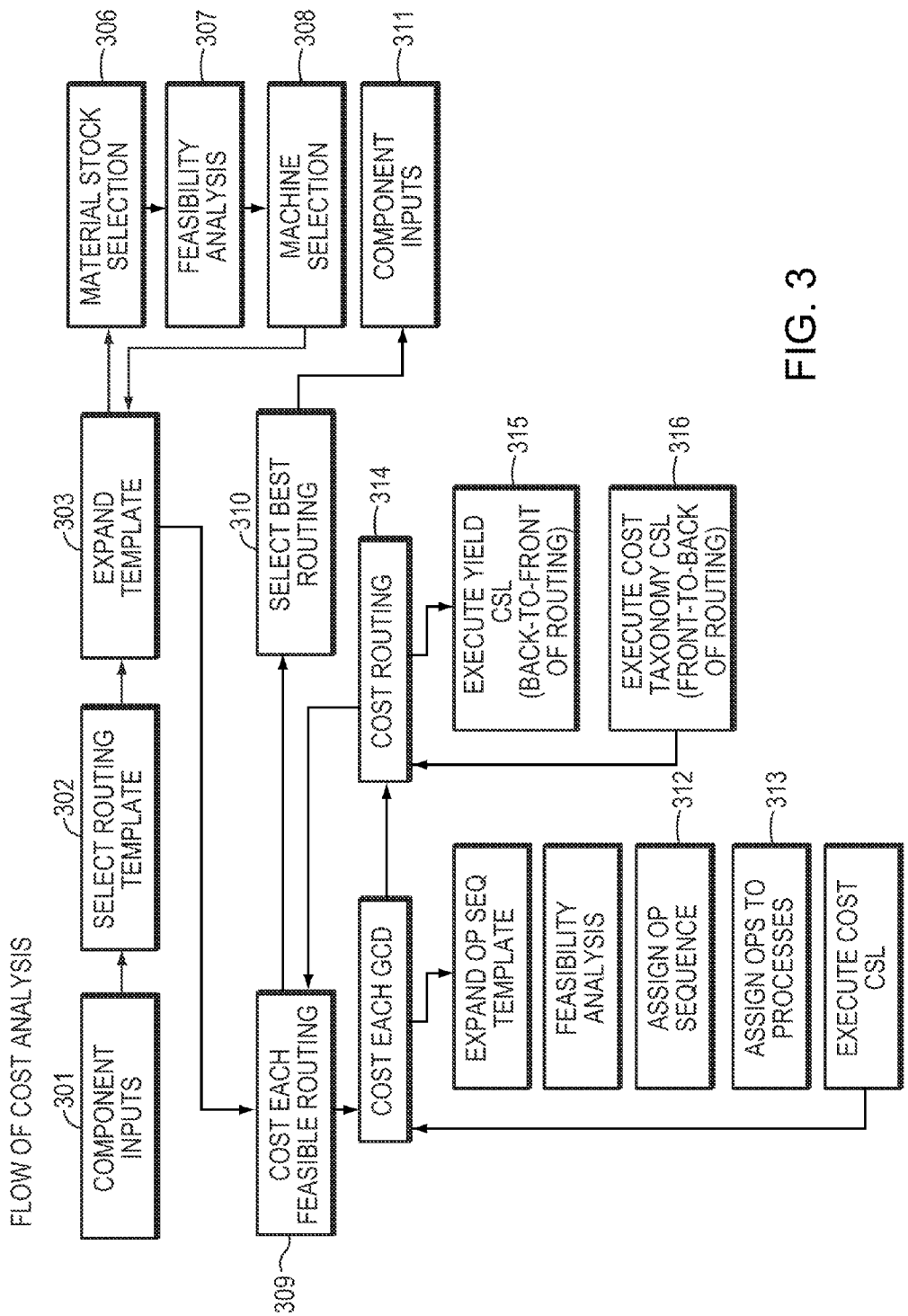
FIG. 3 is a block diagram of a flow of cost analysis, in accordance with an embodiment of the invention.

A description of example embodiments of the invention follows.

In accordance with an embodiment of the present invention, a method for dynamically creating and then automatically selecting an optimum manufacturing process routing is provided. Specifically, a framework for encoding a set of manufacturing processes is provided, with key features including the ability to construct routing definitions hierarchically as well as support for routings containing optional and repeated process steps. The framework provides a language for specifying routing definitions recursively. The primary application of this framework is for optimizing manufacturing cost in a computer-aided design (CAD)-integrated cost management system, however, other applications such as computer aided process planning systems may also utilize this invention to optimize production time or manage capacity constraints.

An embodiment according to the invention may be implemented in the context of an automated costing system of the type described in U.S. Patent Application Publication No. 2005/0120010 A1 of Philpott et al., published Jun. 2, 2005, entitled "System and Method for Determining Costs within an Enterprise," the entire contents of which are incorporated herein by reference. In such a system, a costing system automatically analyzes the geometry and other characteristics of a manufacturable component, which may, for example, be in the process of being designed by a CAD system. The costing system determines a set of cost drivers for the manufacturable component, and stores them in a cost driver database. The cost drivers are variables that the costing system uses in computer-implemented mathematical equations to determine the cost of manufacturing the component. For example, the cost drivers might include the number of small holes and bends in the component, or the perimeter of the component. These features "drive" the cost and are used by the system to calculate, for example, cycle times and incentive times that determine costs. In some cases, the number of features is the cost driver (such as number of holes, edges, and different types of bends, etc.), and in other cases, measurable parameters of the feature may be a cost driver (such as perimeter length, part volume surface area, etc.). In the costing system, feature extraction algorithms may distinguish true manufacturing features—that is, features that directly affect cycle time and cost computation. For example, "small holes" are holes less than 5 mm in diameter, the size below which a laser needs to make a step change in cut speed. As another example, the feature extracting algorithms might identify collinear "bends" that can be completed by one action of a bend brake.

Such a costing system within which an embodiment according to the invention may be used, may include cost engine and cost model components. Specifically, the cost engine is a computer implemented system that uses the logic and data representing a given process, and runs the cost model with reference to the CAD data. The cost engine has logic for implementing the process framework, and is the execution environment for the costing, whereas the cost model is the costing script that is executed by the cost engine.

In the context of such a costing system within which an embodiment according to the invention may be used, there may be provided the ability to define process routings, which identify the allowable sequences of processes or routings that run in a company's factory or at their suppliers' factories. In previous systems, the allowable routings could be specified in a list-like fashion. For example, a script "CTL-Shear-Turret-Bendbrake" could be used to identify a process routing of starting with a cut-to-length (CTL) process, then moving on to a shear process, followed by a turret press, and finishing with a bend brake operation. Another process routing could be defined, for example, as "CTL-Laser-Bendbrake," meaning that a CTL process is followed by a laser process, and finishing with a bend brake operation.

A key challenge in the development of the methodology according to an embodiment of the invention was devising a method for encoding the set of available Process Routings that comprise a real or virtual production facility. Initially, each routing was stored individually as a list of process steps, as just described. However, as the system evolved and the complexity of the manufacturing facility increased, such an approach encounters a number of shortcomings. For example, supposing that the "CTL-Shear-Turret-Bendbrake" process routing could be executed in any order, it would be necessary to specify in a list each different possible combination of orders in which the processes could be implemented: "CTL-Turret-Bendbrake-Shear," "CTL-Bendbrake-Shear-Turret," and so on. When the number of possible operations becomes large, such a technique of specifying process routings could rapidly become prohibitively difficult for a user. And the separate listing of process routings would have to be used even where processes were redundant or related. Shortcomings such as the foregoing are remedied by a Process Routing Template framework in accordance with an embodiment of the invention.

The Process Routing Template framework in accordance with an embodiment of the invention provides a language for specifying Process Routings as a set of trees. Each node in a Process Routing tree represents an individual process. A process may further decompose into a sequence of sub-processes, in which case the process would be represented as a branch node in the tree. The language used to define these trees is referred to as the Process Routing Template Specification Language. A program written in this language is referred to as a Routing Template Specification. Each line in a specification defines a process and the rules used to expand that process into a list of sub-processes.

In an embodiment according to the invention, the process definitions in a template specification are recursive. Additionally, the template specification language supports labeling certain nodes as optional or repeated. Optional nodes represent processes that may or may not be necessary in a given routing depending on the specifics of the part CAD model and the manufacturing environment. The system determines whether or not to include an optional node at runtime by evaluating rules supplied by the underlying manufacturing process model. Optional nodes can also be manually included or excluded by the user. Repeated nodes represent processes that can occur an arbitrary number of times in a routing.

The algorithm used to compute the cost of a part CAD model in a framework according to an embodiment of the invention can be conceptualized as consisting of two distinct phases of analysis: (i) Routing Generation and (ii) Routing Evaluation.

In the Routing Generation phase in an embodiment according to the invention, the cost engine parses the routing template specification supplied by the cost model and produces a set of routing trees to evaluate. A routing tree is produced for each alternative defined in the routing template specification. As part of this phase, the feasibility of each node in the template is evaluated in a depth-first fashion. If a node is found to be infeasible according to the rules supplied by the cost model, the portion of the template rooted at that node is discarded from further analysis.

In the Routing Evaluation phase in an embodiment according to the invention, the Cost Engine computes a detailed cost estimate for each of the generated routing trees. The cost of a routing tree is calculated by performing a post-order traversal of the tree, meaning that the costs of a node's children are computed prior to computing the cost of the node itself. In this way, the cost of a process can be derived from the costs of its sub-processes. Once the total cost of each tree has been computed, the cost engine selects the lowest cost result and presents it to the user. The user can override this selection and choose to cost any subset of the trees defined in the template specification.

A primary advantage of the routing template framework in accordance with an embodiment of the invention is the ability to construct routings hierarchically. Presenting routings as a hierarchical tree of processes instead of a flat list is beneficial from a usability perspective because different classes of users may be interested in exploring varying levels of detail within a set of manufacturing alternatives. For example, a Design Engineer may simply wish to compare the costs of Sand Casting and Die Casting without being concerned with the details of the sub-processes involved in Sand Casting. On the other hand, a Manufacturing Engineer with expert knowledge of the Sand Casting process may wish to explore the tradeoffs between different Core Making processes within Sand Casting. FIG. 1 is an example of a routing template specification in accordance with an embodiment of the invention. The routing template specification shown in FIG. 1 supports both such levels of analysis by defining a hierarchy of alternatives, i.e., a high-level alternative between Sand Casting and Die Casting, and a lower-level set of Core Making alternatives within Sand Casting. Typically, an embodiment according to the invention may be used to select an optimum process routing within constraints that a user of the system has specified. For example, a user could specify that the user wishes to consider only Sand Casting processes. The user may be given choices, in a computer-implemented display, in order to choose which processes are of interest, based on a recursive template in accordance with an embodiment of the invention, such that the recursive template drives the choices available to the user.

In addition, in accordance with an embodiment of the invention, structuring a routing as a hierarchical tree improves the computational efficiency of the feasibility analysis phase of cost analysis because the rules that govern the feasibility of a set of alternatives can be associated with a parent node containing that set, thereby eliminating the need to check each alternative individually. In comparison, a list-based approach would require that each alternative be encoded as a separate routing and analyzed individually.

Another advantage of the routing template framework in accordance with an embodiment of the invention is the ability to label nodes as optional or repeated. This allows the exact sequence of processes in a routing to be determined dynamically based on the specifics of the part CAD model and manufacturing environment being analyzed, and eliminates the need to explicitly list every possible combination of processes when defining the set of valid routings.

In accordance with an embodiment of the invention, templates are used at both the process or component level and at a lower operation level. At the process level the template establishes viable processes, and at the operation level the template defines valid operations or operation sequence.

The template specification language in accordance with an embodiment of the invention may be used by the cost model of a costing system, such as that of U.S. Patent Application Publication No. 2005/0120010 A1 of Philpott et al., published Jun. 2, 2005, entitled "System and Method for Determining Costs within an Enterprise," the contents of which are incorporated herein by reference, including in particular incorporated with reference to the contents related to the costing system, cost engine and cost model. The cost model may include the actual templates, in accordance with an embodiment of the invention, such as the template of FIG. 1; while the cost engine runs the templates.

In the routing template specification of the embodiment of FIG. 1, a syntax is used in which a juxtaposition of processes represents performing one of the processes followed by the other of the processes; while a vertical bar between processes represents a choice between using one or the other of the processes. Thus, for example, the statement:

Casting/Machining::=Casting Machining in the first line of the embodiment of FIG. 1 means that the combined "Casting/Machining" process routing consists of performing the Casting process, followed by performing the Machining process. In the second line, the process of Casting is further defined with reference to its sub-processes, namely, Casting::=SandCasting|DieCasting that is, the process of Casting consists a choice between either performing SandCasting or performing DieCasting. Continuing through the routing template specification of FIG. 1, each process is defined recursively with reference to its sub-processes, if any. In the syntax of FIG. 1, square brackets around a process signifies an optional process.

Routing alternatives can be marked as non auto-selectable or "user-only" by preceding the alternative with ||. For example, in the following template snippet, the Manual Floor alternative has been marked as user-only.

'Molding and Coring'::=VerticalAuto|HorizontalAuto|ManualStandard||ManualFloor

A user-only alternative is presented like a standard alternative in a routing editor. However, in auto-select mode it is ignored by the cost engine and thus will only be costed if the user explicitly selects it.

The primary use for this feature is to speed up auto-costing by limiting the number of alternatives that are considered. It also provides a natural way to include alternatives that are only intended to be used when explicitly indicated by the user.

A template can reference a node defined in another process group. This is referred to as an "external reference" and is indicated by appending a process group modifier to the node. For example, the SimpleHole Casting template might contain the following line:

'Sand Casting'::=Coring 'Finish Machining':Machining

Here, Finish Machining is an external reference to a node defined in the active Machining template. It is possible that the active Machining template does not contain a definition for Finish Machining in which case the node will be removed from the template at runtime.

Nodes with process group names are treated as implicit external references. In other words, the nodes Machining and Machining:Machining are treated equivalently.

External References provide the following benefits:
1. The manufacturing alternatives provided by a secondary progress group are defined in exactly one place (the template belonging to that process group).
2. It is no longer necessary to list specific processes belonging to a secondary process group within the template of a primary process group. This eliminates (or at least reduces) tight coupling between Cost Models.

Multiple versions of a template can be defined, one per primary process group. For example, consider the following Machining component template:

Machining:Casting::=[Turning]['3 Axis Mill']//used when Casting is the primary process group Machining::='3 Axis Mill'//the default, used in all other cases Turning::='2 Axis Lathe'|'3 Axis Lathe'

Here two definitions of the "Machining" template are provided. The first is used when Casting is the primary process group and the second is used in all other cases. Any node can be specialized in this manner, e.g.:

'Finish Machining':'Sheet Metal'::=Reaming|Boring

'Finish Machining'::=Boring

This feature allows the manufacturing alternatives within a secondary process group to vary based on the primary process group, and does so in a way that doesn't require changes to the primary process group template.

Consider the following example SimpleHole template, which defines a set of operation sequences for manufacturing a hole on a 3 Axis Mill:

Machining=Holemaking [Finishing][Threading]
Holemaking 'Standard Drilling'|'Large Hole Milling'
'Standard Drilling'::=['Center Drilling':'3 Axis Mill'] Drilling:'3 Axis Mill'
'Large Hole Milling'::='Rough Milling':'3 Axis Mill' 'Finish Milling':'3 Axis Mill'
Finishing::= . . .
Threading::= . . .

It is now desired to add equivalent operation sequences for a 2 Axis Lathe process and provide a high-level choice between the Milling and Turning a hole. This would require defining multiple definitions of the Holemaking node, one for 3 Axis Mill and a second for 2 Axis Lathe. Alternatively, the same may be achieved with nested scopes. Using nested scopes the template can be rewritten as follows:

```
Machining = Milling | Turning {
    Milling ::= Holemaking [Finishing] [Threading] {
        Holemaking ::= 'Standard Drilling' | 'Large Hole Milling'
        'Standard Drilling' ::= ['Center Drilling':'3 Axis Mill']
        Drilling:'3 Axis Mill'
        'Large Hole Milling' ::= 'Rough Milling':'3 Axis Mill' 'Finish
        Milling':'3 Axis Mill'
        Finishing ::= ...
        Threading ::= ...
    }
```

```
    Turning ::= Holemaking [Finishing] [Threading] {
        Holemaking ::= 'Turn Standard Drilling' | 'Large Hole Turning'
        'Standard Drilling' ::= ['Center Drilling':2 Axis Lathe]
        Drilling:'2 Axis Lathe'
        'Large Hole Turning' ::= Drilling:'2 Axis Lathe' 'Rough
        Turning':'2 Axis Lathe'
        Finishing ::= ...
        Threading ::= ...
    }
}
```

The rewritten template makes use of node scoping to provide two definitions of the Holemaking node (as well as other nodes); one within the context of Milling and the other within the context of Turning. Nodes defined within a { . . . } block only exist within the scope of the enclosing node and cannot be referenced outside it. Note that these scopes can be nested. In the example above, Holemaking is defined within the scope of the Milling node which is in turn defined within the scope of the Machining node.

Following is a description of an embodiment of the invention for a simplified sequence of fabrication processes in a process group referred to here as "Bar and Tube." This has been simplified from the actual embodiment only to assist in the explanation of how it works. FIG. 2 shows a set of templates for the simplified process group, in accordance with an embodiment of the invention. As can be seen, three different possible templates are offered: the Component template, the SimpleHole template, and the Bend template.

FIG. 3 is a block diagram of the overall flow of the cost analysis, in accordance with an embodiment of the invention.

At step 301 of the embodiment of FIG. 3, the Component Inputs are properties related to the individual component being manufactured. For example, these may include a geometry analysis as well as non-geometric manufacturing inputs such as production volume, years of production, where the component is being manufactured, and the materials from which it is made.

At step 302 of the embodiment of FIG. 3, either the user, or the system automatically, has triggered the performance of a cost analysis by the system. In step 302, the Routing Template is selected. The Routing Template is found in the Cost Model. An administrative user of the system may modify the Template, typically as a one-time exercise, based on the routings that are actually available at a given manufacturing plant. In step 302, the Cost Engine determines which Template environment to use, either by using a user-specified Template or by using a default. Individual features of interest in a component have been identified by a geometry analysis (for example, a hole, a bend, etc.). When the Cost Engine runs the Cost Model, the Cost Engine is determining how the features of interest will be manufactured. Thus, for every feature of a component there is a template; and for the component as a whole there is an overall template; and, in some cases, for every assembly of components, there is a template.

At step 303 of the embodiment of FIG. 3, the entire template is expanded as a number of combinations—for example, six combinations for the last two lines 204 and 205 of the Component template of FIG. 2, since there are two possible processes in the HoleMaking process and three possible processes in the Bending process. After the template is expanded in step 303, the system performs a cost analysis (step 309) for each template, by evaluating the cost for each feature; and performing this evaluation for each feasible routing. As will be seen, when an individual feature's cost is being evaluated, it is being evaluated in the context of one specific routing choice. Once each feasible routing has been costed, the best routing is selected (step 310).

Continuing with step 303 of the embodiment of FIG. 3, expanding the template includes performing a feasibility analysis 307 do determine which processes are actually possible. The system also performs a material stock selection 306, to determine the actual size or dimension of the stock. The system also performs a machine selection 308, in which, for each possible routing, the system determines which machine to use. For example, for laser cutting, one could use several different choices of machines with different power levels. In performing machine selection 308, either a user can pre-specify which machines to use, or the cost model can determine which machine to use, using logic within the cost model for determining optimum machine selection.

In step 309 of the embodiment of FIG. 3, the cost engine is used to determine the cost estimate for each of the different possible expanded templates. Each geometric cost driver (GCD) is costed, by determining how each feature will be manufactured in the context of each given routing. At step 312, the first operation in the list of those that is feasible is selected. Then, at step 313, the system maps the operations to the actual processes. For example, the operation of "boring" may be mapped to the process "3Axis Mill," which is a process that supports the operation of boring. Next, in step 309, the cost scripting language (CSL) is executed by the cost engine to determine the cost for the routing. At step 314, cost routing is performed. First, in step 315, the yield CSL determines how much raw material is necessary at the front of the process in order to yield the final part. This is computed from the end back to the beginning of the process (for example, determining losses of material at each stage). Next, in step 316, the cost taxonomy CSL is executed by a front-to-back routing. The taxonomy is a list of the time and cost, and is evaluated depth-first.

In step 310 of the embodiment of FIG. 3, the cost engine selects the lowest cost routing that also manufactures all features, by first determining routings for which all features are completed, and then selecting the lowest cost of the routings that complete all of the features.

In step 311 of the embodiment of FIG. 3, the system has determined the lowest cost routing for manufacturing the component.

FIGS. 4 through 14 are flow charts illustrating operation of a cost analysis, in accordance with an embodiment of the invention. These flow charts illustrate the flow of logic within the Cost Engine when costing a part. An example is provided that uses a simplified version of the Bar & Tube templates (see FIG. 2), and a hypothetical part with a Bend and two SimpleHoles (one with high tolerance).

Figure 4:
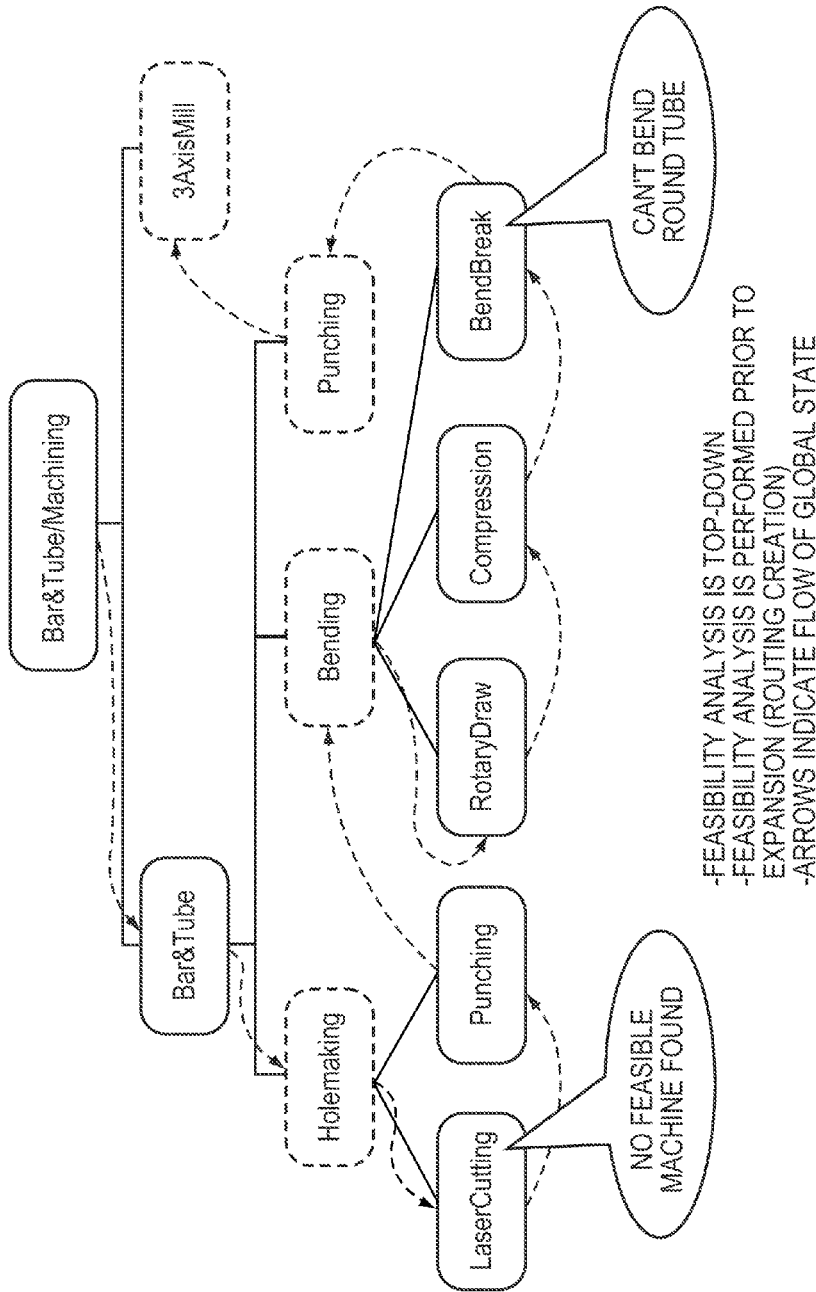
FIGS. 4 through 14 are flow charts illustrating operation of a cost analysis, in accordance with an embodiment of the invention.

In the embodiment of FIG. 4, there is shown a component template. Feasibility Analysis and Machine Selection are performed. The feasibility analysis is top-down, and is performed prior to expansion (routing creation). In FIG. 4, arrows indicate the flow of global state. Navigating the tree, the global state thus goes from the Bar & Tube/Machining process to the Bar&Tube process, to the Holemaking process, and so forth around the tree. However, when the global state reaches the LaserCutting process, the system determines that no feasible machine is found. Likewise, when the system navigates around the tree to the BendBrake process, it is determined that it is not possible to bend around a tube. Thus, the LaserCutting and BendBrake processes are identified as not feasible.

Figure 5:
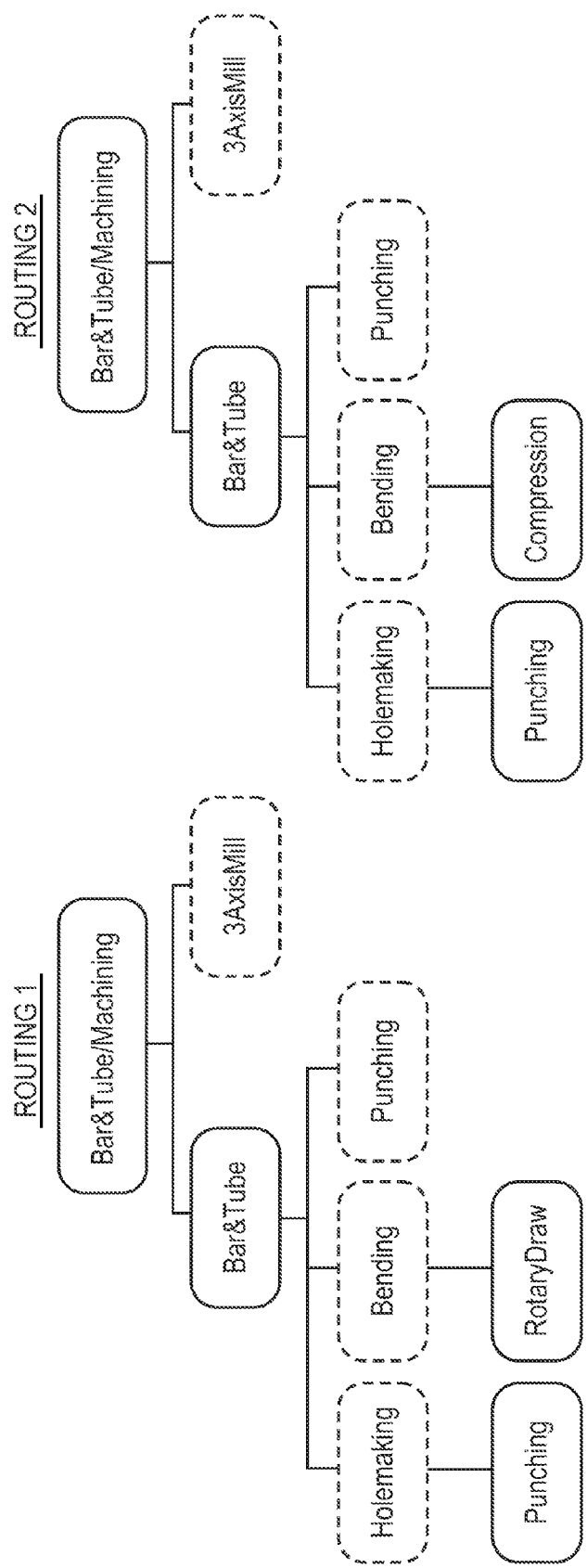

In the embodiment of FIG. 5, the two possible routings resulting from the feasibility analysis and template expansion are shown. In both routings, the LaserCutting and BendBrake processes that were not feasible have been removed, by comparison with FIG. 4. Routing 1 represents the choice of RotaryDraw as the Bending process (see middle of tree), while Routing 2 represents the choice of Compression as the Bending process.

Figure 6:
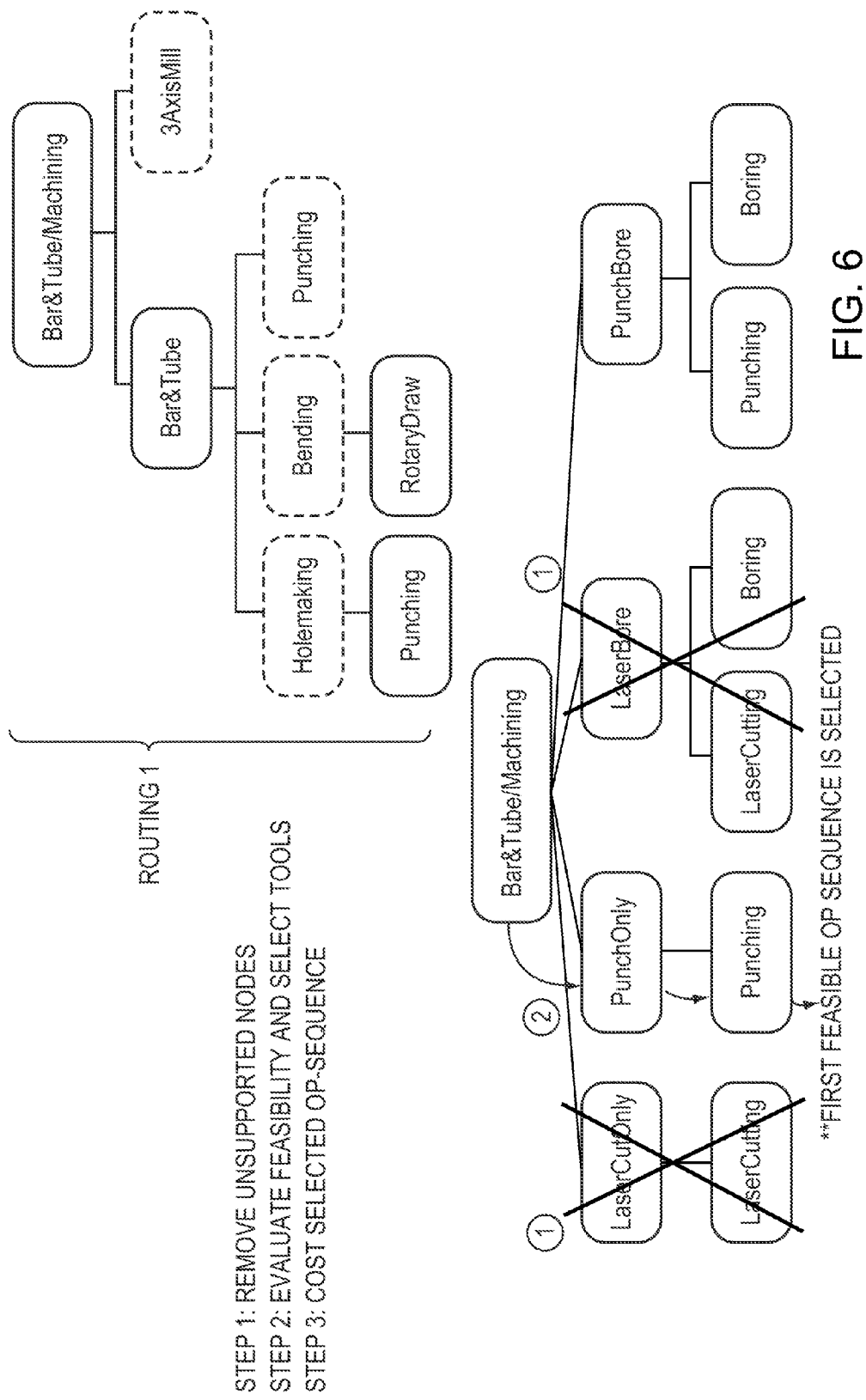

In the embodiment of FIG. 6, there is illustrated the expanding of the templates for the SimpleHole:1 feature in the context of Routing 1 from FIG. 5 (shown in the upper right of FIG. 6). In step 1, all unsupported nodes are removed. Here, the LaserCutOnly and LaserCutting nodes are removed, as well as the LaserBore, LaserCutting and Boring nodes. Next, in step 2, the tree is navigated to evaluate feasibility and select tools. Thus, the system navigates from Bar&Tube/Machining to PunchOnly and then to Punching, at which point the first feasible Operation Sequence has been selected (Bar&Tube/Machining, PunchOnly and Punching). The PunchBore and Punching and Boring nodes have not been selected. Finally, in step 3, the system costs the selected operation sequence.

Figure 7:
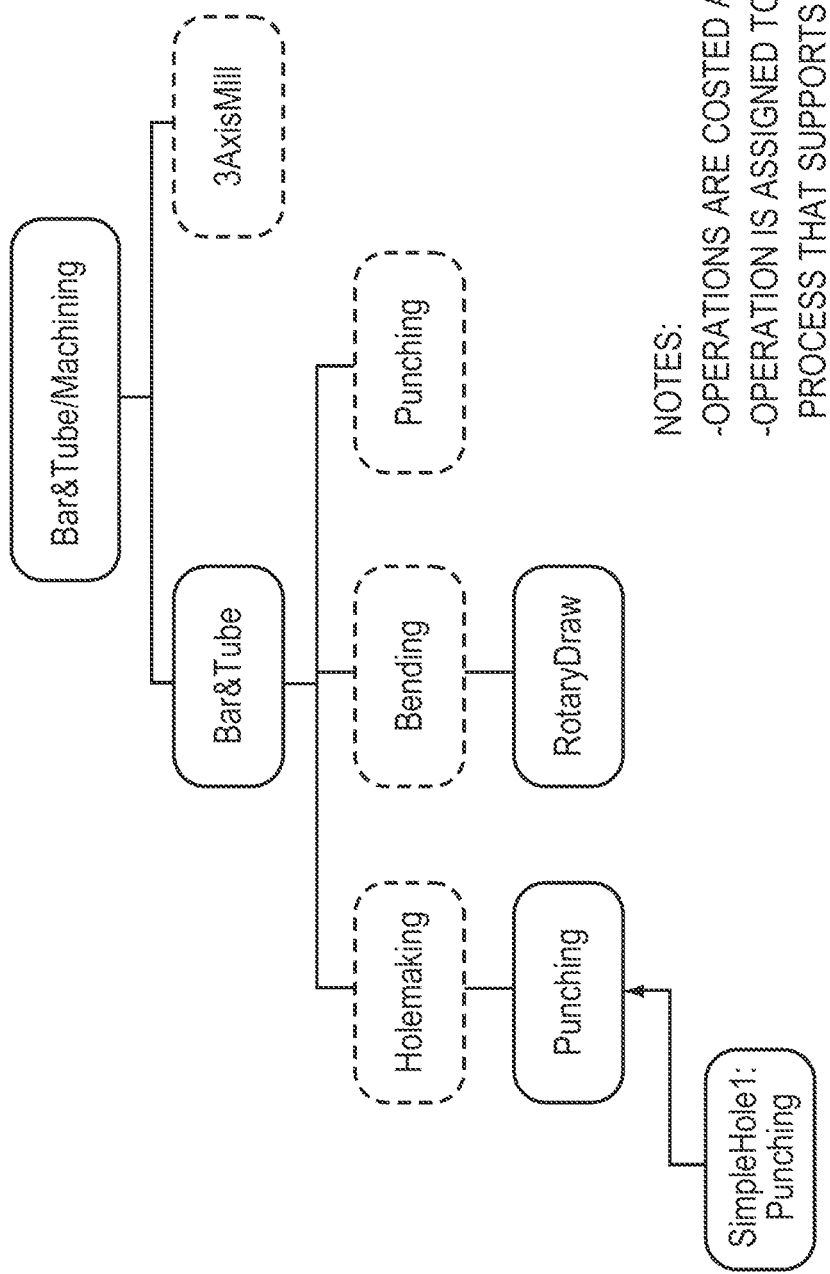

In the embodiment of FIG. 7, there is illustrated the operation assignments after costing the SimpleHole:1 feature. Operations are costed at this point. The operation is assigned to the first process that supports it. For example, here, the SimpleHole1: Punching assignment is made.

Figure 8:
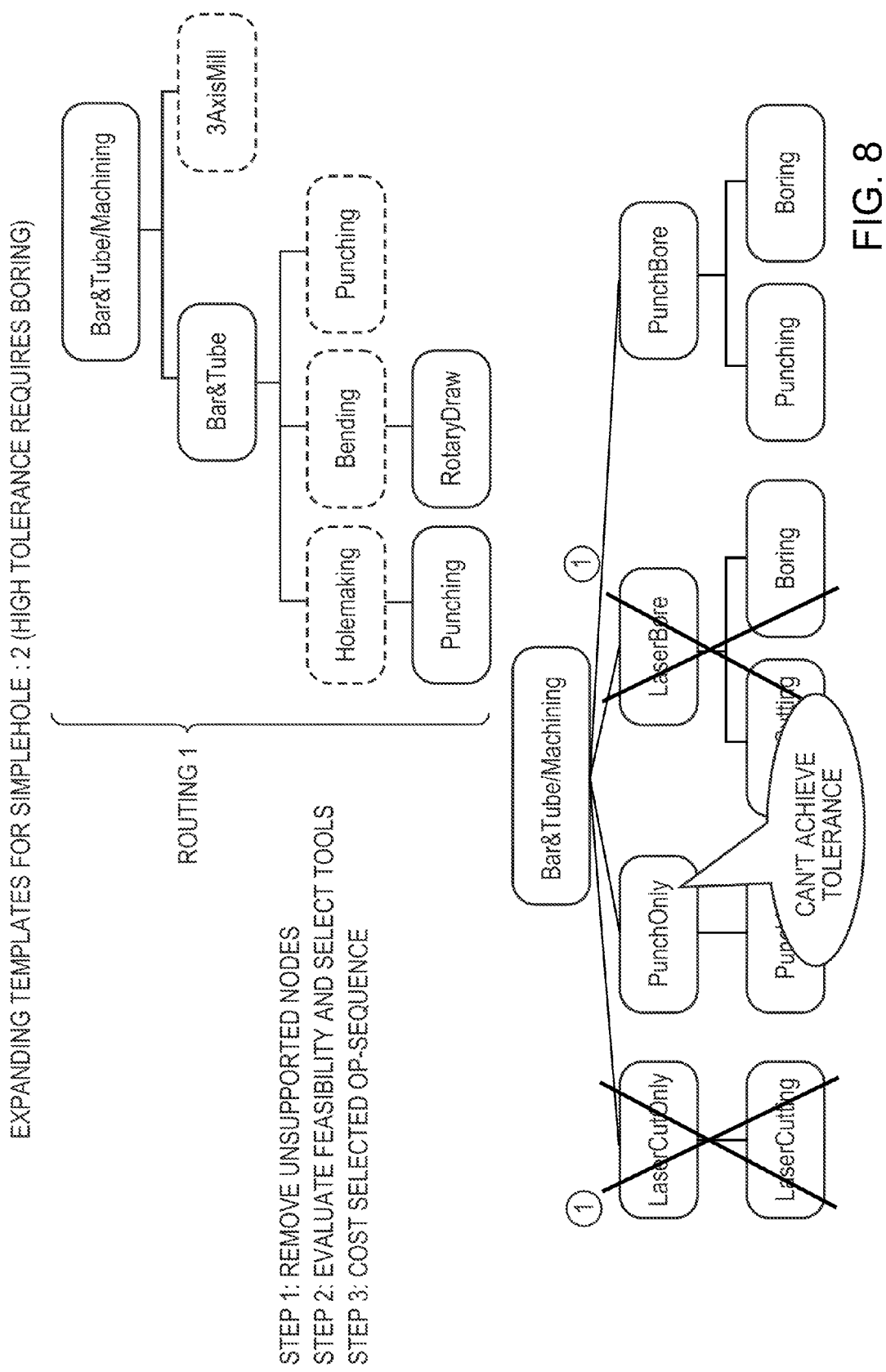

In the embodiment of FIG. 8, there is illustrated the expanding of templates for the feature SimpleHole:2. Here, a high tolerance requires a Boring operation. As with the expanding for SimpleHole:1, the steps are followed of removing unsupported nodes, evaluating feasibility and selecting tools, and costing the selected operation sequence. The unsupported nodes are removed (LaserCutOnly and its child node, and LaserBore and its child nodes). Then, in evaluating feasibility, it is determined that the PunchOnly process cannot achieve the required tolerance, and is therefore determined not to be feasible. Finally, the selected op-sequence is costed, namely, the sequence Bar&Tube Machining, PunchBore, Punching, Boring.

Figure 9:
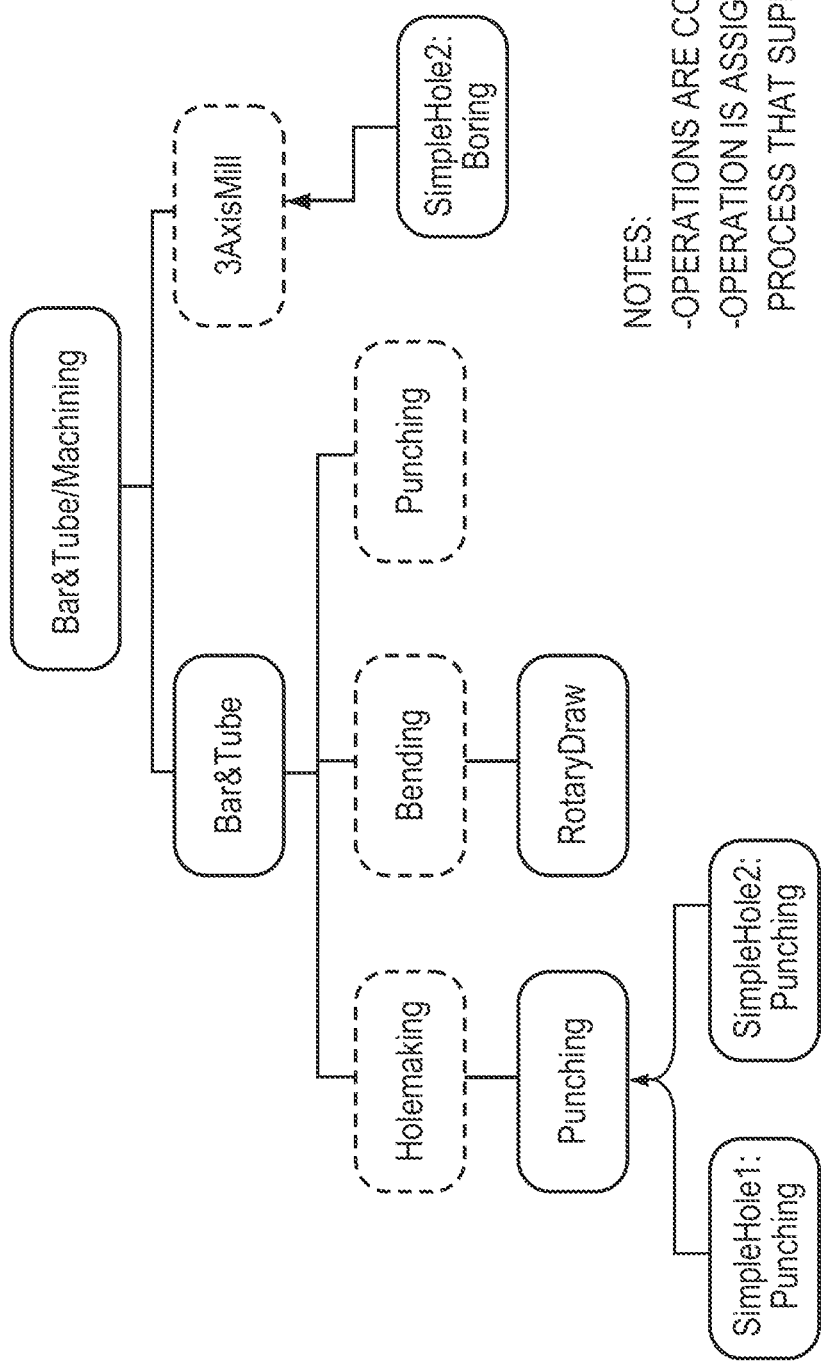

In the embodiment of FIG. 9, there is illustrated the operation assignments after costing SimpleHole:2. Again, operations are costed at this point. Operations are assigned to the first process that supports it. Thus, SimpleHole2:Punching and SimpleHole2:Boring are assigned as shown.

Figure 10:
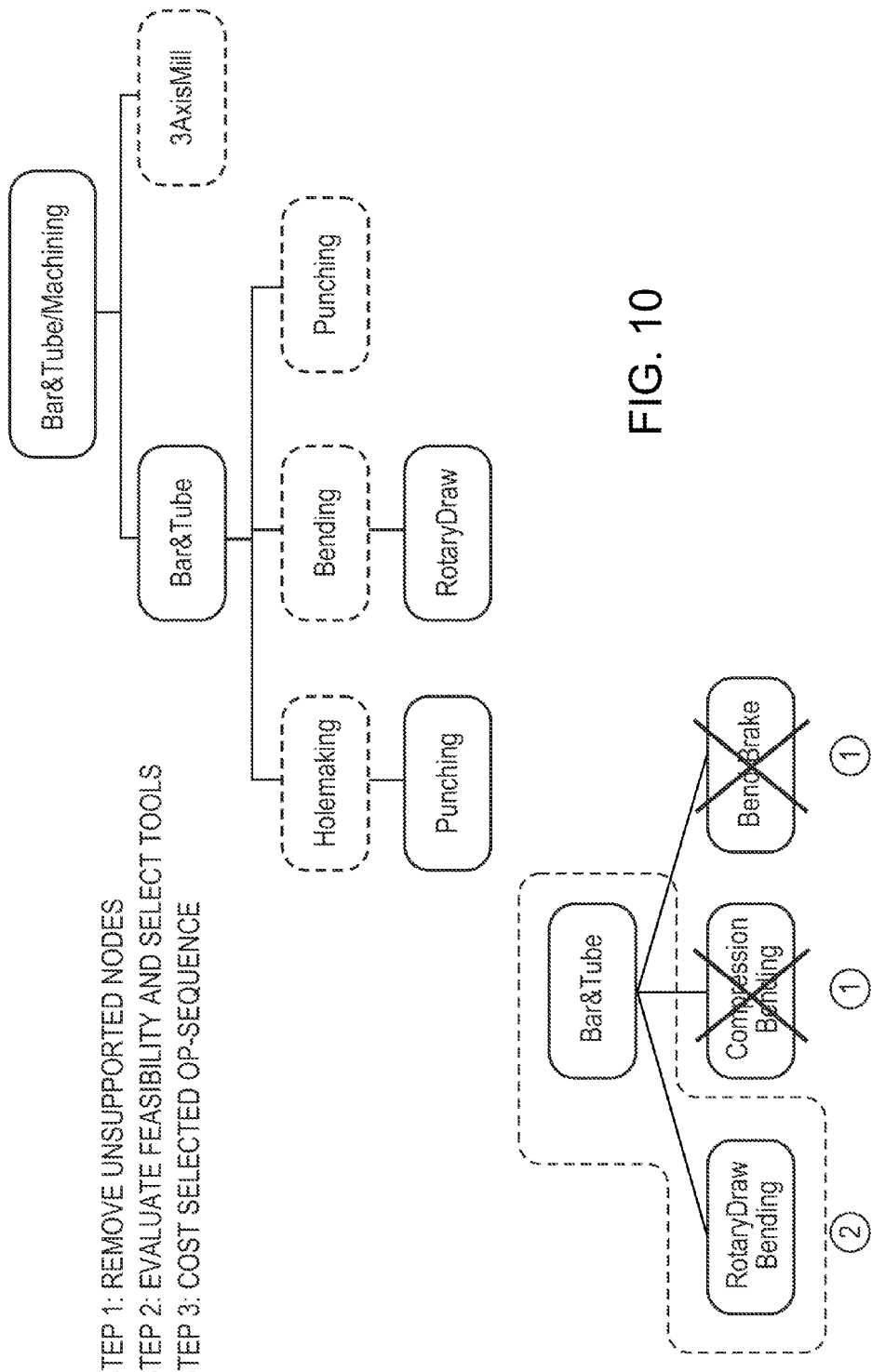

In the embodiment of FIG. 10, there is illustrated the expanding of templates for the Bend:1 feature in the context of Routing 1. As previously, the first step is to remove unsupported nodes: here, the CompressionBending and Bend Brake. Next, step 2 is to evaluate feasibility and select tools—here, the Bar&Tube process followed by RotaryDrawBending is selected. The selected operation sequence is then costed.

Figure 11:
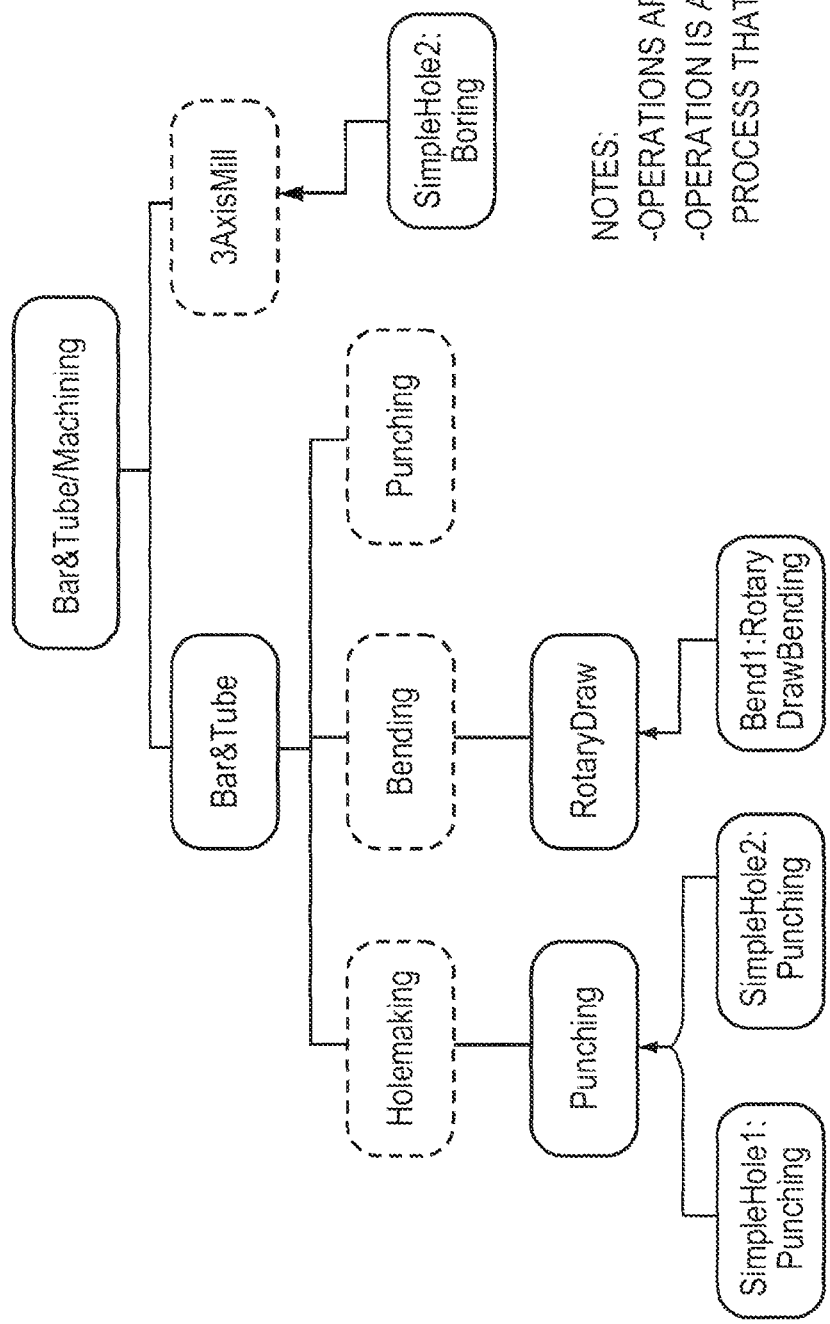

In the embodiment of FIG. 11, there is illustrated the operation assignments after costing the Bend:1 feature. The operation is assigned to the first process that supports it. The Bend:1 feature is assigned to RotaryDraw Bending.

Figure 12:
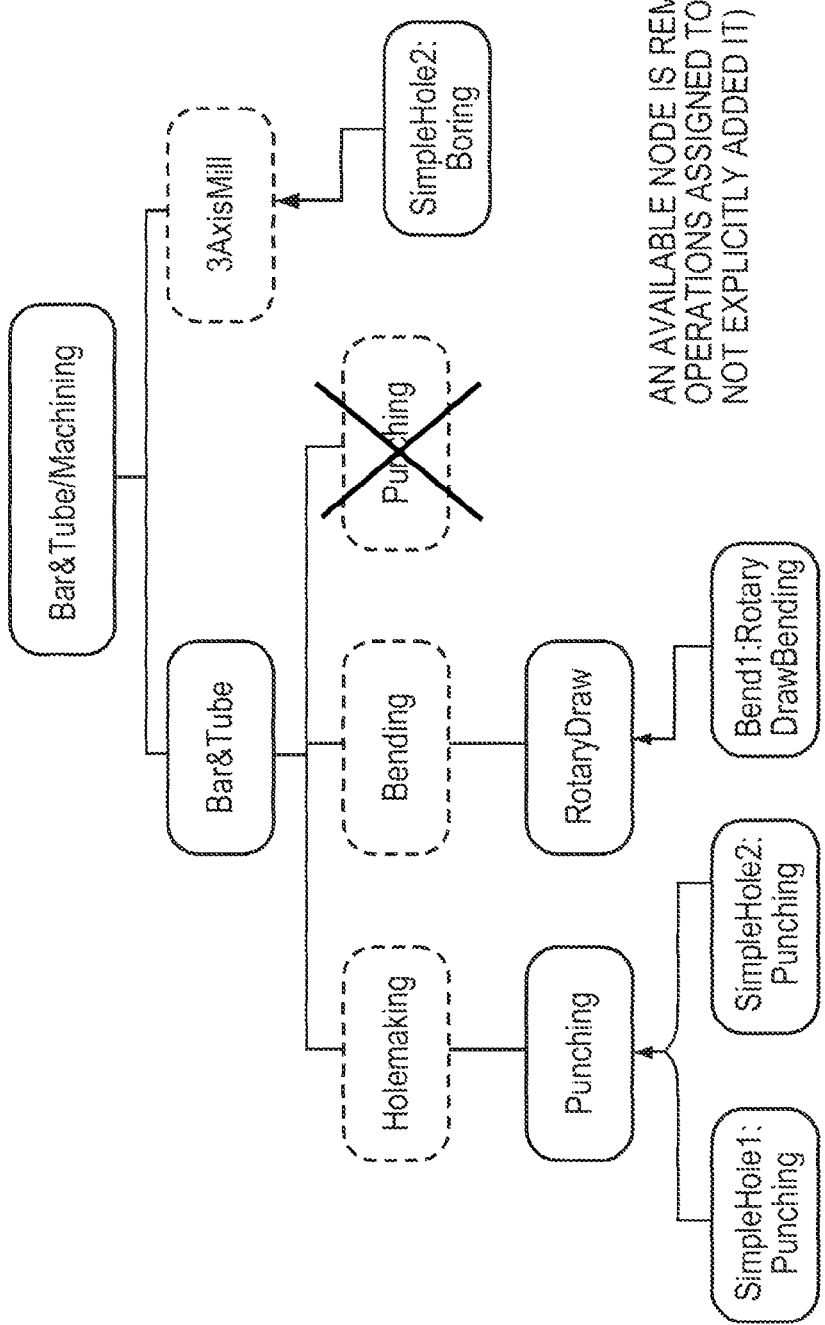

In the embodiment of FIG. 12, there is illustrated the removing of unused available (system-optional) nodes. An available node is removed if there are no operations assigned to it (and the user has not explicitly added it). Here, the Punching node is removed.

Figure 13:
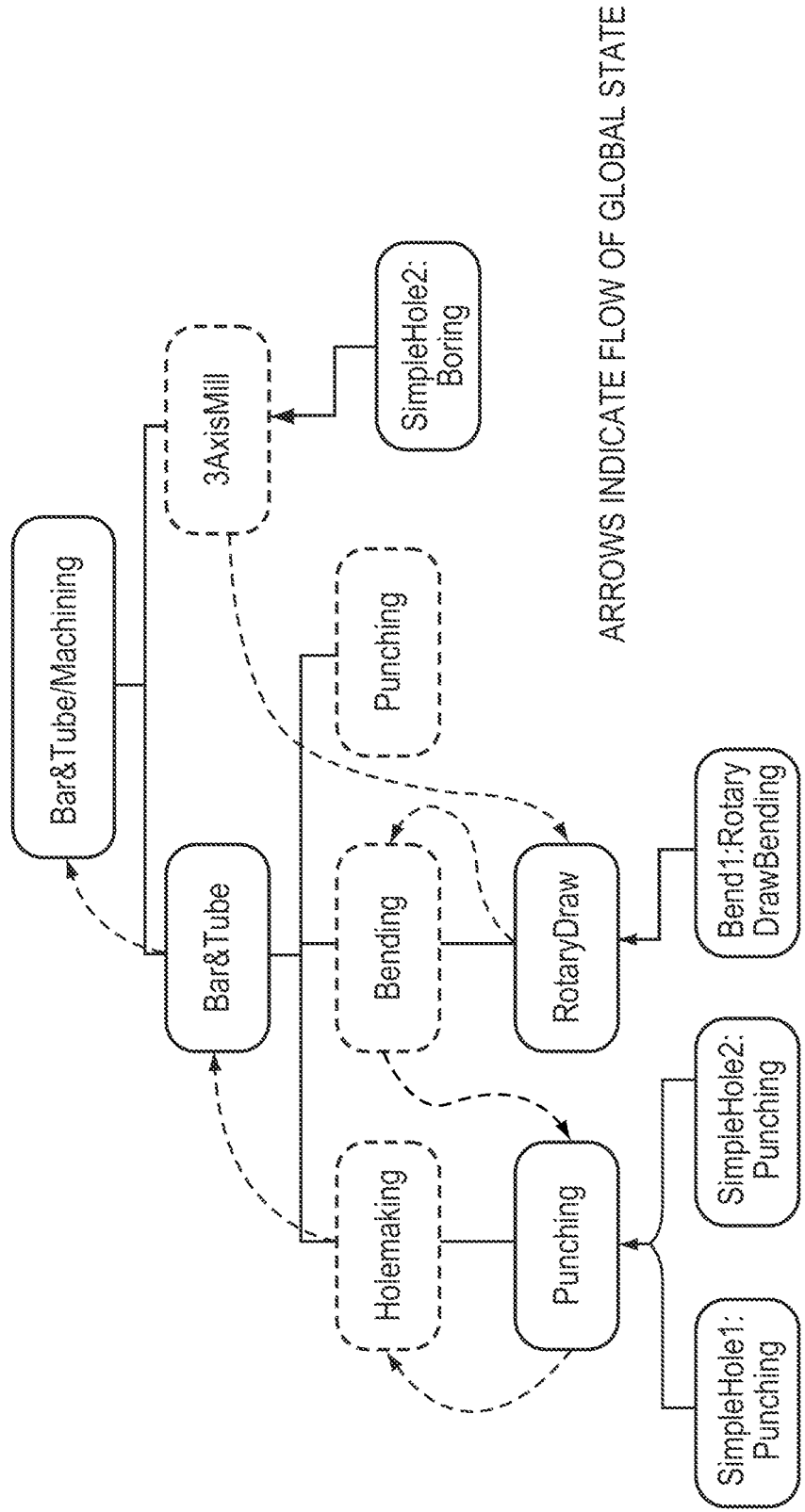

In the embodiment of FIG. 13, there is illustrated the costing of Routing 1—here, the first pass, which involves calculating yield. The arrows indicate the flow of global state.

Figure 14:
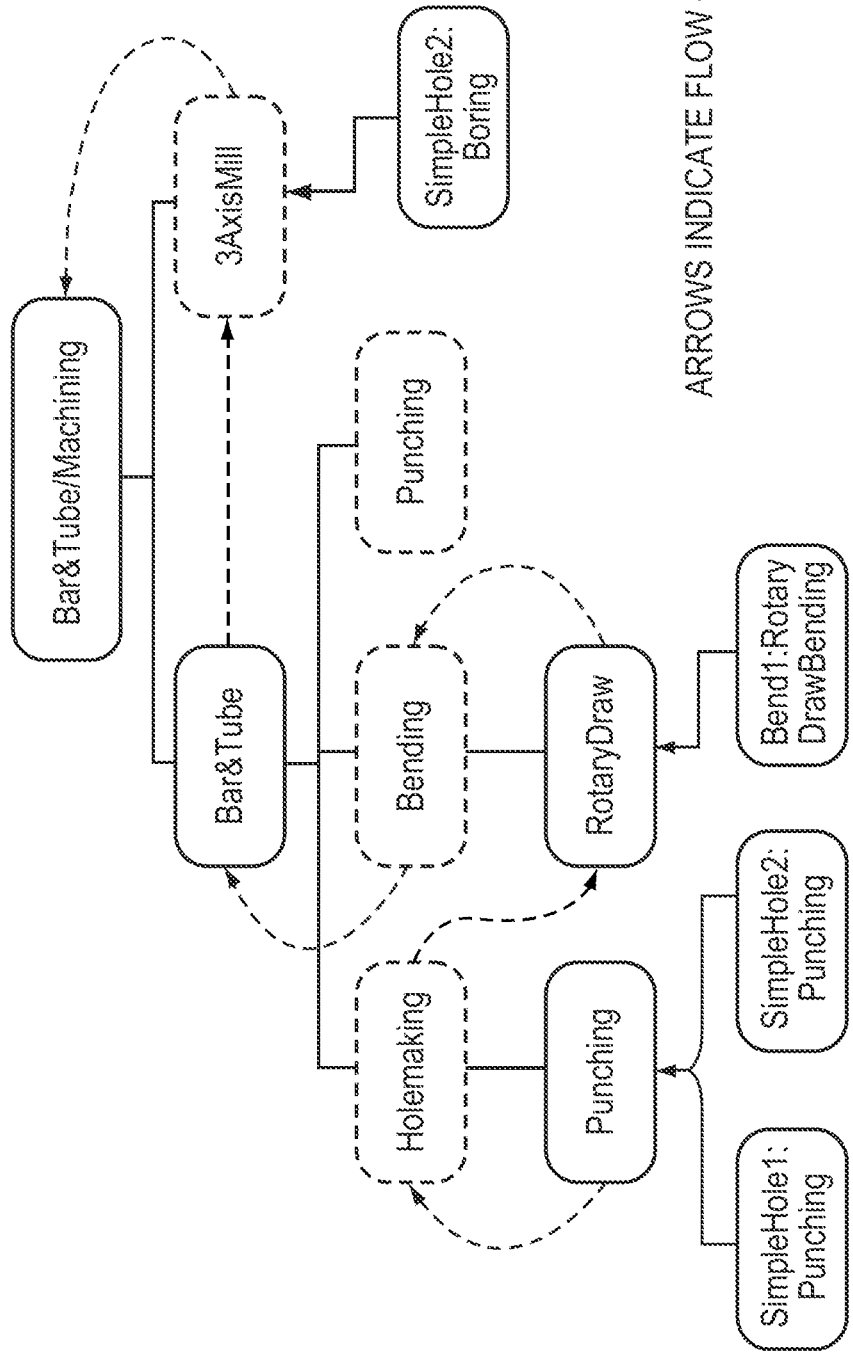

In the embodiment of FIG. 14, there is further illustrated the costing of Routing 1—here, the second pass, which involves calculating cost taxonomy. The arrows indicate the flow of global state.

In another embodiment according to the invention, there is provided a technique for determining an optimum number of times to perform a repeated process. Such a technique may be advantageous, for example, for staged tooling. In this embodiment, a template encodes a node that is to be repeated, and the cost model determines how many times to repeat the node. The cost model determines the operation sequence for each geometric cost driver; and then determines how to assign processes using the minimum number of variable processes that are needed. Compatibility and precedence rules are used to determine which process steps are used. The system creates new process steps "on the fly" as it performs the evaluation. For example, such a technique could be used in the context of stage tooling, where a compatibility rule could specify, for example, when holes may not be used if they are too close together. The technique involves first creating one stage of a tooling process, and assigning an operation to it; then determining whether a second operation can be assigned; and so forth, until the operation fails a compatibility rule. Then the technique creates the second stage of the tooling process. Thus, the technique uses a similar process to that discussed above, but with the addition of compatibility and precedence rules.

FIGS. 15 through 20 are examples of templates in accordance with an embodiment of the invention. FIG. 15 is an illustration of a sheet metal component template for sheet metal fabrication, while FIG. 16 is the template for a simple hole and FIG. 17 is the template for a bend, within the context of sheet metal fabrication. The sheet metal component template of FIG. 15 illustrates the syntax that may be used for repeated nodes, for example for stage tooling: parentheses and an asterisk are used. FIG. 18 is a casting component template, while FIG. 19 is a template for a simple hole and FIG. 20 is a template for a void, within the casting context. Here, a void is a manufacturing feature, or geometric cost driver, that is created to represent regions of negative space around a part that a casting mold needs to fill.

Figure 21:
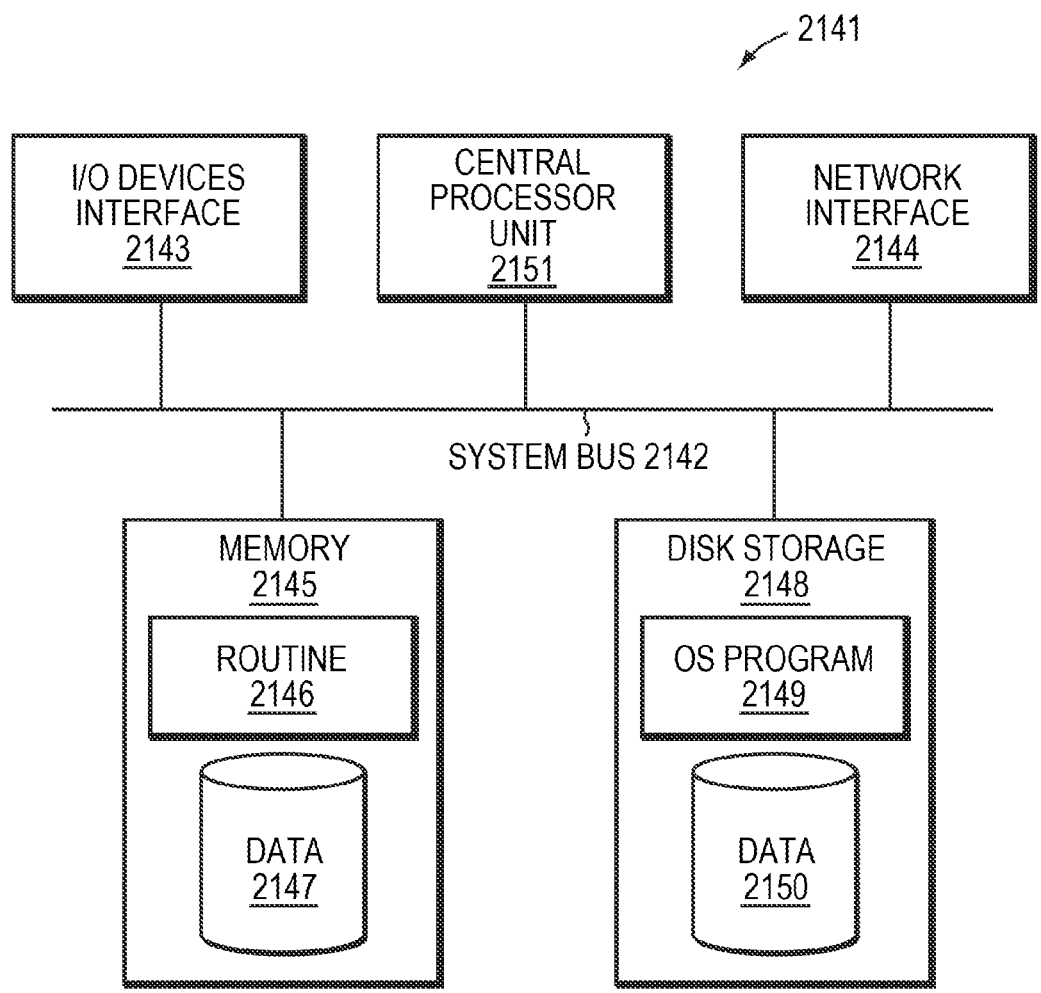
FIG. 21 is a diagram of the internal structure of a computer which may be used for implementing an embodiment according to the invention.

FIG. 21 is a diagram of the internal structure of a computer 2141 which may be used for implementing an embodiment according to the invention. The computer 2141 contains system bus 2142, where a bus is a set of hardware lines used for data transfer among the components of a computer or processing system. Bus 2142 is essentially a shared conduit that connects different elements of a computer system (e.g., processor, disk storage, memory, input/output ports, network ports, etc.) that enables the transfer of information between the elements. Attached to system bus 2142 is I/O device interface 2143 for connecting various input and output devices (e.g., keyboard, mouse, displays, printers, speakers, etc.) to the computer 2141. Network interface 2144 allows the computer to connect to various other devices attached to a network. Memory 2145 provides volatile storage for computer software instructions 2146 and data 2147 used to implement an embodiment of the present invention (e.g., the routing generation system and the routing evaluation system). Disk storage 2148 provides non-volatile storage for computer software instructions 2149 and data 2150 used to implement an embodiment of the present invention. Central processor unit 2151 is also attached to system bus 2142 and provides for the execution of computer instructions.

In one embodiment, the processor routines 2146 and data 2147 are a computer program product (generally referenced 2146), including a computer readable medium (e.g., a removable storage medium such as one or more DVD-ROM's, CD-ROM's, diskettes, tapes, etc.) that provides at least a portion of the software instructions for any aspect of the invention system. Computer program product 2146 can be installed by any suitable software installation procedure, as is well known in the art. In another embodiment, at least a portion of the software instructions may also be downloaded over a cable, communication and/or wireless connection.

Further, it will be appreciated that an embodiment according to the invention may be implemented by one or more than one computer processor, potentially located on one or more than one computer, any or all of which computers or computers processors may be connected to each other over a network, including local and wide area networks and/or the Internet.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims

What is claimed is:

1. A method for determining an optimum manufacturing process routing, the method comprising:
   electronically representing a plurality of manufacturing process routings for a component to be manufactured, the electronically representing comprising representing at least a component template for the component and a geometric cost driver template for at least one geometric cost driver of the component, the electronically representing being performed using at least one computer processor programmed to electronically represent the plurality of manufacturing process routings; and
   electronically determining an optimum process routing of the plurality of manufacturing process routings by applying a cost model to the component template and to the geometric cost driver template for the at least one geometric cost driver, the applying the cost model being based on component inputs including a geometric model of the component, and determining the optimum process routing that minimizes the cost for manufacturing the component, the electronically determining being performed using the at least one computer processor, the at least one computer processor being further programmed to electronically determine the optimum process routing.

2. The method according to claim 1, wherein the component inputs further include non-geometric manufacturing inputs that affect the cost of manufacturing the component.

3. The method according to claim 2, wherein the non-geometric manufacturing inputs comprise at least one of production volume, years of production, location of manufacturing of the component, and materials.

4. The method according to claim 1, wherein the at least one geometric cost driver is selected from the group consisting of number of holes, number of edges and type of bend.

5. The method according to claim 1, wherein the at least one geometric cost driver is selected from the group consisting of perimeter, volume, and surface area.

6. The method according to claim 1, wherein the geometric model is a computer-aided design.

7. A system for determining an optimum manufacturing process routing, the system comprising at least one computer processor, the at least one computer processor including:
   a routing generation system programmed to electronically represent a plurality of manufacturing process routings for a component to be manufactured, the electronically representing comprising representing at least a component template for the component and a geometric cost driver template for at least one geometric cost driver of the component; and
   a routing evaluation system programmed to electronically determine an optimum process routing of the plurality of manufacturing process routings by applying a cost model to the component template and to the geometric cost driver template for the at least one geometric cost driver, the applying the cost model being based on component inputs including a geometric model of the component, and determining the optimum process routing that minimizes the cost for manufacturing the component.

8. The system according to claim 7, wherein the component inputs further include non-geometric manufacturing inputs that affect the cost of manufacturing the component.

9. The system according to claim 8, wherein the non-geometric manufacturing inputs comprise at least one of production volume, years of production, location of manufacturing of the component, and materials.

10. The system according to claim 7, wherein the at least one geometric cost driver is selected from the group consisting of number of holes, number of edges and type of bend.

11. The system according to claim 7, wherein the at least one geometric cost driver is selected from the group consisting of perimeter, volume, and surface area.

12. The system according to claim 7, wherein the geometric model is a computer-aided design.

* * * * *